United States Patent Office 2,902,056
Patented Sept. 1, 1959

2,902,056

METHODS OF MANUFACTURING FLUID-TIGHT HIGH-PRESSURE PIPES OF REINFORCED CONCRETE AND PIPES MADE ACCORDING TO SAID METHODS

Josef Bössner, Bad Aibling, Bavaria, Germany

Application June 5, 1957, Serial No. 663,659

Claims priority, application Germany December 8, 1956

6 Claims. (Cl. 138—66)

This invention relates to methods of manufacturing fluid-tight high-pressure pipes made of reinforced concrete and to pipes of the type indicated made according to the method of the present invention.

It is known that pipes made of reinforced concrete, particularly reinforced-concrete pipes used as water conduits, can only be used successfully at relatively low internal pressures which do not exceed about 57 pounds per square inch (4 kilograms per square centimeter), because such pipes tend to develop leaks.

It is one of the objects of the present invention to provide a simple and economical method of manufacturing reinforced concrete pipes which will remain fluid-tight also at higher internal pressures than those indicated above and which may, for example, be used as water pipes.

It is a further object of the invention to provide a method of manufacturing fluid-tight high-pressure pipes of reinforced concrete whereby the external surface of the core of the form or mold used in giving the concrete the required shape is provided with a layer of a suitable plastic foil material, which material will firmly adhere to the inner periphery of the concrete pipe after the latter has been removed from the said form. Conveniently that side of the foil material which comes into contact with the concrete may be roughened by any suitable treatment so as to improve its adherence to the inner wall of the pipe.

The materials which are suitable for lining the concrete pipes include all fluid-tight materials which combine the necessary durability with a degree of elasticity or dilatability that is sufficient to allow the material to conform to any deformation of the pipe walls as caused by the internal fluid pressure. Particularly suitable for the purposes of the invention are certain plastic materials, such as plastic based on polyvinylchloride, which afford, among other things, the advantage that they can be easily shaped and welded. Depending on the diameter of the pipe to be lined, the aforementioned materials may be used in thicknesses of, for example, 1 mm. or 2 mm. (0.040" or 0.080"), and where desired, greater thicknesses may be provided.

The invention may be carried into practice in several different ways. For example, where the lining material is available in tubular or hose form, it will be convenient to cut the material into sections of suitable length and to slide such a tubular section over each of the cores around which the concrete is to be molded, it being possible, if desired, to join adjacent ends of the abutting hose sections by welding. Under certain circumstances, however, it may be convenient to give the lining the required shape by using the selected lining material in strip form and to wind it helically about the mold core.

According to another aspect of the invention it is possible to compose the lining of thin sheets or strips of the selected material, which sheets or strips may either be placed longitudinally on the mold core or may be arranged to surround the said core in a transverse direction, whereupon the sheets or strips are interconnected along their longitudinal or transverse edges by welding or by any other suitable method.

The roughening of the lining material, which is intended to promote the establishment of a firm bond between the lining and the inner surface of the concrete pipe may, for example, be in the form of grooves, flutes, serrations or teeth of any desired shape, the said teeth having, for example, an undercut configuration so as to resemble the teeth of a file. If desired, the surface of the plastic lining material may also be roughened by a sandblasting operation.

Since the construction of the molds or forms and the manner in which the concrete body of the pipe is shaped correspond with known practice in the art, no further explanation is deemed necessary.

The present invention further contemplates the provision of a pipe line structure which is composed of a plurality of pipe sections made by the instant method. According to the invention the said pipe line structure is composed of two differently shaped types of pipe sections the respective shapes of which are such as to permit a pipe line to be constructed by inserting into both ends of a pipe section of a first type one pipe section each of a second type. For this purpose, the bearing surfaces of both the first and the second types of pipe section are given a double tapered configuration.

Other objects, features and advantages of the present invention will be readily apparent from the following detailed description of a preferred embodiment thereof, taken in conjunction with the accompanying drawings, in which.

Figure 1:
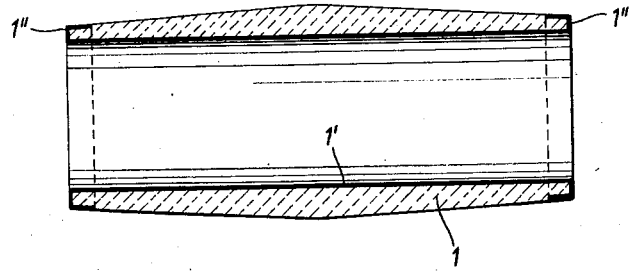
Fig. 1 is a longitudinal sectional view of a first type of pipe section according to the invention.
Figure 2:
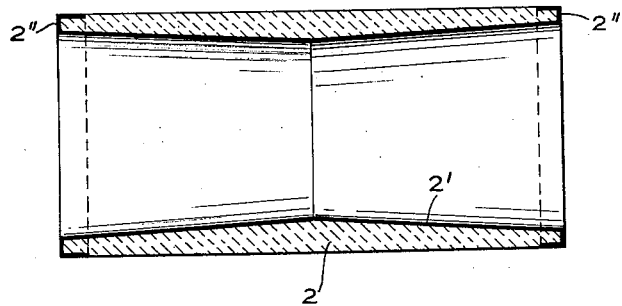
Fig. 2 is a longitudinal sectional view of a second type of pipe section according to the invention.
Figure 3:
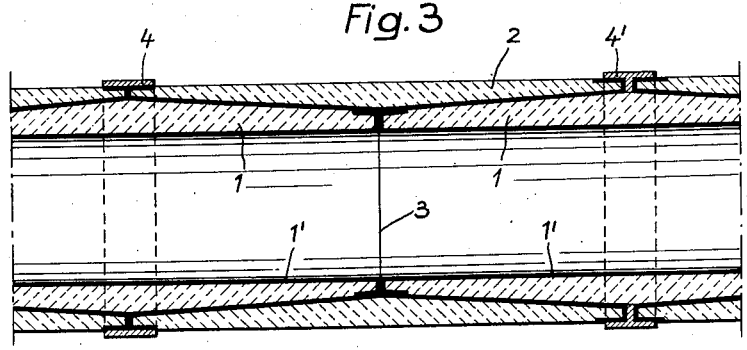
Fig. 3 is a longitudinal sectional view of a pipe line structure according to the invention which is composed of a plurality of pipe sections embodying the first and the second types of sections shown in Figs. 1 and 2.

Referring now more particularly to the drawings, Fig. 1 shows a pipe section 1 the inner wall of which is of cylindrical shape, whereas its outside wall is in the form of a double taper. Conversely, the pipe section 2 as shown in Fig. 2 has a cylindrical external surface, whilst its inner wall is in the form of a double taper. The inner profile of the pipe section 2 and the external profile of the pipe section 1, both in a longitudinal direction, conform to each other in such a manner as to permit a pipe line of any desired length to be constructed in the manner illustrated in Fig. 3, whereby alternating pipe sections of the first and second types are telescoped together to form a continuous pipe having a cylindrical bore and a continuous cylindrical external surface.

The inner surfaces of both type 1 and type 2 pipe sections are lined, according to the aforementioned method, with layers 1' and 2', respectively, of a suitable plastic foil material which may be folded outwardly over the end faces of the respective pipe sections as indicated at 1" and 2", respectively, in Figs. 1 and 2. It will be understood that it is convenient, if desired, to dimension the wall thickness of the pipe sections in such a manner that the maximum wall thickness of each pipe section amounts to approximately two-thirds of the total wall thickness in the respective transverse plane of the finished pipe line structure.

After the pipe line structure is completely assembled, the plastic liners 1' provided on the inside of the pipe sections 1 may be welded together at the joints 3 in order to provide an effective seal at the said joints.

The joints between the outer pipe sections 2 may be fitted with annular sleeves 4 which serve the dual purpose of improving the mechanical strength of the joints and sealing them.

In order to improve the adherence between the nested pipe sections and to provide for an effective seal between the double-tapered seating surfaces thereof, the external surface of the pipe body 1 may be treated, before the pipe sections are assembled, with a paste or liquid which is adapted, when it is brought into contact with the plastic liner 2' on the inside of the pipe section 2, to cause the liner 2' to swell. Such liquids or pastes are per se known. The swelling of the plastic lining is accompanied by a softening action, this providing for a tight and durable bond between the seating surfaces of the two tubular bodies.

The sleeves disposed on the outside of the pipe line at the location of the joints between adjacent sections may also have a substantially T-shaped cross-section.

The pipe line of the invention may also be used in the construction of galleries, in which case the pipe line will be assembled within a tunnel-like duct provided in rock or soil, the space between the periphery of the pipe line and the inside of the tunnel subsequently being filled with concrete under pressure in order to support the pipe line from the tunnel wall.

I claim:

1. A high-pressure pipe line structure comprising an axially arranged series of inner tubular bodies abutting in end-to-end relation, each of said inner tubular bodies having a cylindrical inner surface and an outer surface with a maximum diameter at the center of the inner tubular body and tapering toward the opposite ends of the latter, and an axially arranged series of outer tubular bodies abutting in end-to-end relation and extending around said series of inner tubular bodies, each of said outer tubular bodies having a cylindrical outer surface and an inner surface with a maximum diameter at its opposite ends substantially equal to said maximum diameter at the center of each inner tubular body and tapering from said opposite ends of the outer tubular body toward the center of the latter, the degree of taper of said inner surface of each outer tubular body being substantially equal to the degree of taper of the outer surface of each inner tubular body, the axial length of each outer tubular body being approximately equal to the axial length of each inner tubular body, and each outer tubular body having two of said inner tubular bodies extending axially therein from its opposite ends and abutting at the center of the outer tubular body.

2. A high-pressure pipe line structure as in claim 1; wherein each of said inner and outer tubular bodies is formed of reinforced concrete, and at least said inner surface of each inner tubular body has a lining of a plastic foil which is resistant to chemical and mechanical attack.

3. A high-pressure pipe line structure as in claim 2; wherein each of said outer tubular bodies also has a lining of said plastic foil on said inner surface thereof; and wherein the plastic foil lining of each of said inner and outer tubular bodies is folded radially outward across the opposite end faces of the related body in order to provide an effective seal at the abutting ends of the series of inner and outer tubular bodies.

4. A high-pressure pipe line structure as in claim 3; further comprising annular sleeves extending around the abutting end portions of successive bodies of said series of outer tubular bodies and enclosing the outwardly folded plastic foil linings at the ends of the outer tubular bodies.

5. A high-pressure pipe line structure as in claim 2; wherein the maximum and minimum thicknesses of each inner tubular body are approximately equal to the maximum and minimum thicknesses, respectively, of each outer tubular body, and said maximum thickness being approximately twice said minimum thickness so that the maximum thickness of each of said inner and outer tubular bodies is approximately equal to two-thirds the total thickness of the pipe line structure formed therefrom.

6. A method of making a high-pressure pipe line structure comprising the steps of forming a plurality of reinforced concrete inner and outer tubular bodies of equal length with each inner tubular body having a cylindrical inner surface and an outer surface which tapers toward the opposite ends thereof from a maximum diameter at the center and with each outer tubular body having a cylindrical outer surface and an inner surface which tapers toward the center thereof from maximum diameters at the opposite ends of the outer tubular body which are approximately equal to said maximum diameter at the center of the outer surface of each inner tubular body, the degree of taper of the outer surface of each inner body being approximately equal to the degree of taper of the inner surface of each outer body, applying a plastic foil lining to the inner surface of each of said inner and outer tubular bodies, coating the outer surface of each of said inner tubular bodies with a substance suitable for softening and causing swelling of said plastic foil when contacted with the latter, and alternately axially telescoping said inner and outer tubular bodies so that said inner bodies form an axially arranged, end-abutting series and said outer bodies form an axially arranged end-abutting series surrounding said inner bodies with the abutting ends of adjacent inner bodies being disposed approximately at the center of an outer body extending therearound, and with said substance on the outer surfaces of said inner bodies contacting the plastic foil linings on the inner surfaces of said outer bodies to cause softening and swelling thereof for providing an effective seal between the inner and outer bodies.

References Cited in the file of this patent

UNITED STATES PATENTS

| | | |
|---|---|---|
| 2,321,277 | Boyle | June 8, 1943 |
| 2,816,323 | Munger | Dec. 17, 1957 |